United States Patent
Juefei-Xu et al.

(10) Patent No.: US 10,115,004 B2
(45) Date of Patent: Oct. 30, 2018

(54) METHODS AND SOFTWARE FOR HALLUCINATING FACIAL FEATURES BY PRIORITIZING RECONSTRUCTION ERRORS

(71) Applicant: Carnegie Mellon University, Pittsburgh, PA (US)

(72) Inventors: Felix Juefei-Xu, Pittsburgh, PA (US); Dipan K. Pal, Pittsburgh, PA (US); Marios Savvides, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 48 days.

(21) Appl. No.: 15/307,099

(22) PCT Filed: Jun. 17, 2015

(86) PCT No.: PCT/US2015/036269
§ 371 (c)(1),
(2) Date: Oct. 27, 2016

(87) PCT Pub. No.: WO2015/195827
PCT Pub. Date: Dec. 23, 2015

(65) Prior Publication Data
US 2017/0046562 A1 Feb. 16, 2017

Related U.S. Application Data

(60) Provisional application No. 61/998,043, filed on Jun. 17, 2014.

(51) Int. Cl.
*G06K 9/00* (2006.01)
*G06T 5/00* (2006.01)
(Continued)

(52) U.S. Cl.
CPC ..... *G06K 9/00268* (2013.01); *G06K 9/00281* (2013.01); *G06K 9/00288* (2013.01);
(Continued)

(58) Field of Classification Search
None
See application file for complete search history.

(56) References Cited

U.S. PATENT DOCUMENTS

2009/0185723 A1   7/2009   Kurtz et al.
2011/0305404 A1   12/2011  Lin et al.
(Continued)

OTHER PUBLICATIONS

Z. Z Wang, R. Hu, S. Wang and J. Jiang, "Face Hallucination Via Weighted Adaptive Sparse Regularization," in IEEE Transactions on Circuits and Systems for Video Technology, vol. 24, No. 5, pp. 802-813, May 2014.*

(Continued)

*Primary Examiner* — Kim Vu
*Assistant Examiner* — Nathan Bloom
(74) *Attorney, Agent, or Firm* — Downs Rachlin Martin PLLC

(57) ABSTRACT

Identifying a masked suspect is one of the toughest challenges in biometrics that exist. This is an important problem faced in many law-enforcement applications on almost a daily basis. In such situations, investigators often only have access to the periocular region of a suspect's face and, unfortunately, conventional commercial matchers are unable to process these images in such a way that the suspect can be identified. Herein, a practical method to hallucinate a full frontal face given only a periocular region of a face is presented. This approach reconstructs the entire frontal face based on an image of an individual's periocular region. By using an approach based on a modified sparsifying dictionary learning algorithm, faces can be effectively reconstructed more accurately than with conventional methods.

(Continued)

Further, various methods presented herein are open set, and thus can reconstruct faces even if the algorithms are not specifically trained using those faces.

20 Claims, 12 Drawing Sheets

(51) Int. Cl.
  *G06N 99/00* (2010.01)
  *G06K 9/62* (2006.01)

(52) U.S. Cl.
  CPC ......... *G06K 9/6255* (2013.01); *G06N 99/005* (2013.01); *G06T 5/003* (2013.01); *G06T 5/005* (2013.01); *G06T 2207/20081* (2013.01); *G06T 2207/30201* (2013.01)

(56) References Cited

U.S. PATENT DOCUMENTS

| | | |
|---|---|---|
| 2013/0121589 A1 | 5/2013 | Gokturk et al. |
| 2014/0037199 A1 | 2/2014 | Aharon et al. |
| 2014/0063236 A1 | 3/2014 | Shreve et al. |
| 2014/0079297 A1 | 3/2014 | Tadayon et al. |
| 2015/0363634 A1* | 12/2015 | Yin ............... G06K 9/00221 382/118 |

OTHER PUBLICATIONS

Chih-Yuan Yang, Sifei Liu, Ming-Hsuan Yang; The IEEE Conference on Computer Vision and Pattern Recognition (CVPR), 2013, pp. 1099-1106.*

Wang, N., Tao, D., Gao, X. et al. Int J Comput Vis (2014) 106: 9. https://doi.org/10.1007/s11263-013-0645-9.*

Zeyde, Roman, Michael Elad, and Matan Protter. "On single image scale-up using sparse-representations." International conference on curves and surfaces. Springer, Berlin, Heidelberg, 2010.*

International Search Report and Written Opinion dated Sep. 15, 2015, in connection with PCT/US15/36269, filed Jun. 17, 2015.

Jiang, Zhuolin et al., Label Consistent K-SVD: Learning a Discriminative Dictionary for Recognition; IEEE Transactions on Pattern Analysis and Machine Intelligence, vol. 35, No. 11, Nov. 2013; pp. 2651-2664.

Koh, Min-Sung et al., Turbo Inpainting: Iterative K-SVD with a New Dictionary; in Multimedia Signal Processing, 2009. MMSP '09. IEEE International Workshop on, pp. 1-6, Oct. 2009.

* cited by examiner

METHODS AND SOFTWARE FOR HALLUCINATING FACIAL FEATURES BY PRIORITIZING RECONSTRUCTION ERRORS

RELATED APPLICATION DATA

This application claims the benefit of priority of U.S. Provisional Patent Application Ser. No. 61/998,043, filed on Jun. 17, 2014, and titled "Methods for facial image matching," which is incorporated by reference herein in its entirety.

STATEMENT REGARDING FEDERALLY SPONSORED RESEARCH OR DEVELOPMENT

This invention was made with government support under grant 2013-IJ-CX-K005 awarded by the National Institute of Justice. The government has certain rights in the invention.

FIELD OF THE INVENTION

The present disclosure generally relates to the field of computer graphics processing. In particular, the present disclosure is directed to methods and software for hallucinating facial features by prioritizing reconstruction errors.

BACKGROUND OF THE INVENTION

Over the past few decades, biometric identification and verification using facial features has gained prominence both in traditional video surveillance/access control systems and in hand-held devices for daily use. Most of these approaches work under the implicit assumption that the entire face of a subject can be captured with decent quality. However, there are many real-world scenarios where only a partial face is captured or instances when only the eye region of a face is visible, especially for the cases of uncooperative and non-cooperative subjects. Conventional commercial matchers and law enforcement agencies who rely on such matchers to perform face matching for identification will typically run into problems in the case where only the periocular region is available. This is due to the fact that commercial matching algorithms are developed using the entire human face and typically simply cannot deal with partial faces.

SUMMARY OF THE INVENTION

Aspects of the present disclosure focus on deducing information from the periocular region of the face, which is rich in textural information (e.g., eyebrows, eye folds, eyelid contours, etc.) that can all vary in shape, size and color. Biologically and genetically speaking, more complex structure means more "coding processing" going on during fetal development, and therefore more proteins and genes involved in the determination of appearance. In view of this, the periocular region may be the most important facial area for distinguishing people. Robust periocular based biometric recognition can lead to very useful applications, such as identifying criminals captured in photos wearing masks where only the eye region is exposed or in videos containing many occluded faces with un-occluded eye regions, among others.

A novel approach is proposed herein that can be used to hallucinate a full face as a function of the periocular region of a subject with high fidelity devoted to the known periocular region. The approach is based on the modification of a problem formulated for sparsely coded dictionary learning. In some embodiments, methods of the present disclosure focus on reconstructing the periocular region faithfully while providing a good visual approximation of facial features that can be used for further processing. In hallucinating the rest of the face, these methods capitalize on weak correlations between periocular features and other facial features. These correlations might exist due to specific gender, ethnicity or age, which are soft-biometric in nature. Various approaches described herein find these relations in an unsupervised manner from a large corpus of frontal training images. Throughout the disclosure, the term "hallucination" and "reconstruction" are used interchangeably.

In one implementation, aspects of the disclosure are directed to a method of hallucinating facial features by prioritizing reconstruction errors. Such a method may include receiving an image of a first region of a first face, the first region containing one or more first facial features; training a machine-learning algorithm using a set of images each containing a region of a face of an individual corresponding to the first region and a region of the face of the individual not corresponding to the first region to produce machine-learning data or receiving machine-learning data corresponding to a previous implementation of such training; and hallucinating one or more second facial features of the first face, the second facial features differing from the one or more first facial features, as a function of the machine-learning data by prioritizing reconstruction errors for hallucinating the one or more second facial features such that reconstruction error for the one or more first facial features is minimized with a higher priority than reconstruction error for hallucinating the one or more second facial features.

In another implementation, aspects of the disclosure are directed to a machine-readable storage medium containing machine-executable instructions for performing a method of hallucinating facial features by prioritizing reconstruction errors. Such machine executable instructions may include a first set of machine-executable instructions for receiving an image of a first region of a first face, the first region containing one or more first facial features; a second set of machine-executable instructions for training a machine-learning algorithm using a set of images each containing a region of a face of an individual corresponding to the first region and a region of the face of the individual not corresponding to the first region to produce machine-learning data or receiving machine-learning data corresponding to a previous implementation of such training; and a third set of machine-executable instructions for hallucinating one or more second facial features of the first face, the second facial features differing from the one or more first facial features, as a function of the machine-learning data by prioritizing reconstruction errors for hallucinating the one or more second facial features such that reconstruction error for the one or more first facial features is minimized with a higher priority than reconstruction error for hallucinating the one or more second facial features.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein.

DETAILED DESCRIPTION OF THE PREFERRED EMBODIMENTS

In some aspects, the present disclosure is directed to methods and software for hallucinating facial features by prioritizing reconstruction errors, for example, by weighting errors in reconstructing a periocular region such that they are minimized with higher priority than errors in reconstructing the rest of the face or vice versa (minimizing errors in reconstructing the rest of the face with higher priority). Although the disclosure focuses primarily on hallucinating facial features, various aspects of the disclosure can be implemented as a function of a variety of data in order to hallucinate various related data. For example, although various embodiments disclosed herein hallucinate a full face as a function of an image of a periocular region, similar techniques can be used to hallucinate one, two, or many features of a face not included in the periocular region. Further, although the present disclosure focuses on utilizing two-dimensional frontal mugshot images in training and hallucinating a similar two-dimensional frontal mugshot image as a function of a periocular region, the techniques disclosed herein can be extended to three-dimensional applications without undue experimentation.

Additionally, there is generally no limitation as to which portion of a face can be used to hallucinate unknown features of the face; for example, an image of a single eye could be used to hallucinate a nose, lips, and/or other features. Further still, the techniques disclosed herein can be used to hallucinate an entire body as a function of an image of a periocular or other region. For example, a two-dimensional image of a periocular region could be used to hallucinate a three-dimensional representation of a full body. The techniques disclosed herein could also be used in areas other than human biometrics; for example, various techniques disclosed herein can be used to hallucinate a full face or full body of a dog (or other animal) as a function of only a portion of the dog's face. The techniques can even be extended beyond hallucinations of biological lifeforms; for example, various techniques disclosed herein can be used to hallucinate geological or other features as a function of a limited set of data (e.g., geological mapping data). Accordingly, the techniques disclosed herein are clearly not limited only to the specific examples and particular embodiments described in detail herein. Any image of any item that has a correlated relationship with any other item can be used to hallucinate the other item as a function of an image of even a portion of the item, provided that judicious training is performed and sufficient data is available for such training. Those of ordinary skill in various arts will, after reading this disclosure in its entirety, readily appreciate the broad swath of applications enabled by the techniques disclosed herein and be able to implement those applications without undue experimentation.

Figure 1:
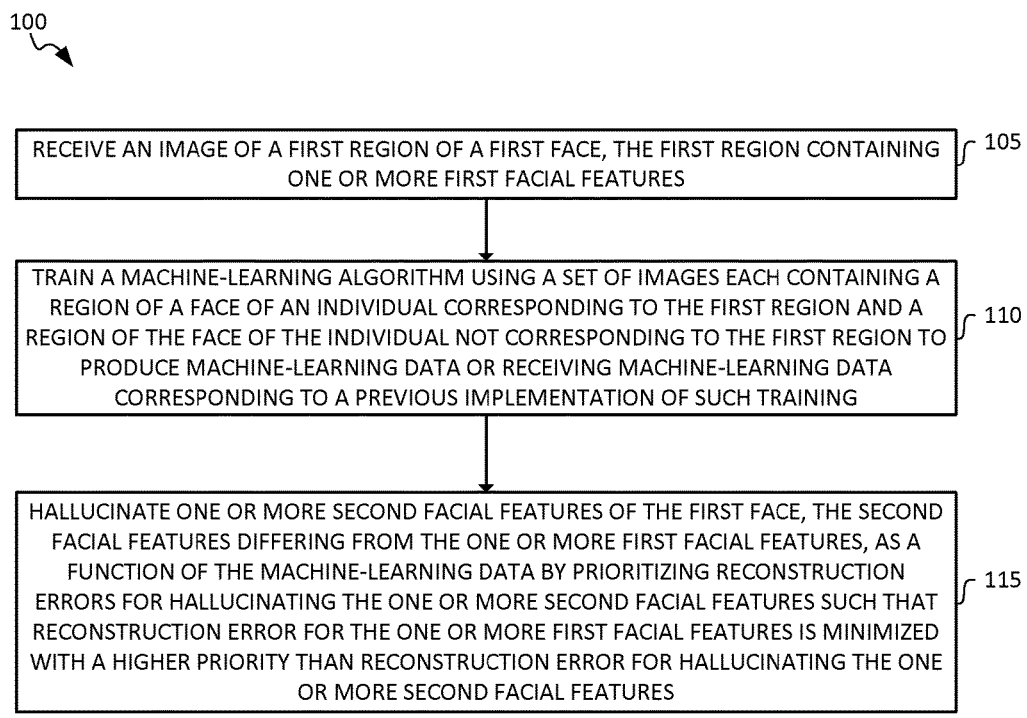
FIG. 1 is a flow diagram illustrating an exemplary method of hallucinating facial features by prioritizing reconstruction errors.

Referring now to the drawings, FIG. 1 illustrates an exemplary method 100 of hallucinating facial features by prioritizing reconstruction errors. Such a method may use a machine-learning algorithm such as a K-SVD algorithm, a convolutional neural network algorithm, an autoencoder algorithm, a sparse filtering algorithm, a method of optimized directions algorithm, an online dictionary learning method, or a recursive least squares dictionary learning algorithm, among others, or a combination thereof. By training the algorithm appropriately (as described further herein), a full face or an unknown portion of a face can be hallucinated as a function of a small subset of the face.

Step 105 includes receiving an image of a first region of a first face, the first region containing one or more first facial features. Such an image may be obtained from security camera footage, a digital photo, video footage, or any other source, provided that it includes at least one facial feature of at least one face. As will be appreciated by those skilled in the art, such an image may be received digitally, physically, or otherwise and converted to an appropriate format either automatedly, manually, or by a combination thereof. Generally, there are no restrictions on how the image is received or from who, what, or where it is received.

Step 110 includes training a machine-learning algorithm using a set of images each containing a region of a face of an individual corresponding to the first region and a region of the face of the individual not corresponding to the first region to produce machine-learning data or receiving machine-learning data corresponding to a previous implementation of such training. In some embodiments, the set of images may consist of images of individuals of a particular gender or set of genders, sex, ethnicity or set of ethnicities, age or range of ages, or a combination thereof, wherein the particular gender or set of genders, ethnicity or set of ethnicities, age or range of ages, or combination thereof is selected as a function of the first face. This can help to increase the accuracy of subsequent hallucinations, and similar limitations on training images can be implemented for other types of images than human faces. For example, if a dog is to be hallucinated (perhaps a dog bit someone and a portion of its face was captured by a security camera), the set of images may consist of dogs of a particular sex, breed or set of breeds, etc., as a function of the subject or target dog (i.e., similar to the subject dog) such that the subsequent hallucination may be more accurate. In some embodiments, one entity (such as a research or intelligence organization) may implement the training of step 110 such that another entity such as a law enforcement agency or other security company, may receive data corresponding to that training and use that data in the subsequent step to hallucinate one or more second features.

Step 115 includes hallucinating one or more second facial features of the first face, the second facial features differing from the one or more first facial features, as a function of the machine-learning data by prioritizing reconstruction errors for hallucinating the one or more second facial features such that reconstruction error for the one or more first facial features is minimized with a higher priority than reconstruction error for hallucinating the one or more second facial features. In this way, second features up to or beyond a full face can be reconstructed from a limited set of one or more first features, although accuracy will vary depending on various factors, as described further herein. By using a method like method 100, law enforcement officials may be able to identify criminals who otherwise would never have been as easily identified and perhaps even solve cold cases that have remained unsolved for many years or even decades.

In some embodiments, method 100 may be extended to facial recognition applications. For example, a hallucinated face (e.g., a full face composite comprising first and second features) may be automatedly compared to a set of images of actual faces in order to attempt to identify whether one of the actual faces correlates strongly with the hallucinated face. Additionally, although method 100 is described above primarily from a particular perspective, various ones of the steps may be performed by different entities, via cloud computing technology, or otherwise, without departing from the spirit and scope of the present disclosure.

Having established general facets of the present disclosure, various embodiments, applications, and alternatives will now be presented.

1. Algorithmic Approach

An approach to the problem of hallucinating a complete face as a function of the periocular region is discussed herein. A description of PCA based reconstruction in the context of this problem is first presented. Throughout the disclosure, the data matrix $Y \in \mathbb{R}^{d \times n}$ is assumed with dimension d. All matrices have their elements arranged columnwise.

1.1 PCA Based Hallucination

PCA has proven to be a popular subspace learning method over the years, and has also found many applications in denoising. In embodiments of the present disclosure, PCA can be applied in a straight-forward way to hallucinate the entire face based on the periocular region. For example, it can be assumed that D is the global PCA basis of the full face data and that the periocular region can be obtained by using a mask $\Lambda$ which is the set of particular dimensions from an image belonging to that region. Given an unseen periocular image of a subject $y_\Lambda$, the goal is to obtain y. The PCA projection coefficients $x=(D_\Lambda^T D_\Lambda)^{-1} D_\Lambda y_\Lambda$ can then be obtained. Here, $D_\Lambda$ is the dictionary restricted to dimensions or rows of the matrix in the set A. Finally, the reconstruction y using y=Dx can be obtained. Note that during reconstruction, all dimensions of D are used. Even though PCA provides a simple approach to this problem, since it learns a single global subspace, each testing sample would tend to have a very similar reconstruction. Thus, very little biometric information is preserved in the reconstruction rendering the problem largely unsolved.

1.2 K-SVD Based Hallucination

Dictionary learning methods have gained popularity in the recent decade. One such algorithm is the K-SVD algorithm (K-means singular value decomposition). K-SVD aims to be a natural extension of K-means clustering with the analogy that the cluster centers are the elements of the learned dictionary and the memberships are defined by the sparse approximations of the signals in that dictionary. Formally, it provides a solution to the problem minimize$_{D,X}\|Y-DX\|_F^2$ such that $\forall i, \|x_i\|_0 < K$, where Y, D and X are the available data, the learned dictionary and the sparse approximation matrix respectively. Here $\|.\|_0$ is the pseudo-norm measuring sparsity. The sparse approximations of the data elements are allowed to have some maximum sparsity $\|x\|_0 \leq K$.

K-SVD has found multiple practical applications, such as image denoising and inpainting. However, these applications are ones in which the number of missing or corrupted pixels is not significant and do not contain any explicit spatial structure. In such a scenario, patch-based reconstructions using the learned dictionary would be useful. However, in various embodiments of the present disclosure, where a majority of the pixels are missing in a structured manner, patch-based reconstruction is not ideal. Rather, an approach similar in spirit to the PCA based reconstruction would need to be applied.

One method for hallucination using K-SVD is to train a generative dictionary D using a large number of full faces. Each of the dictionary elements would then be the first eigenface of its member training samples. Unlike PCA, K-SVD avoids learning a global subspace and in turn approximates using multiple local subspaces. Given a novel periocular image of an unseen subject $y_\Lambda$, the sparse coding x can be obtained in the dimensionally restricted $D_\Lambda$ using any sparse coding algorithm such as OMP (Orthogonal Matching Pursuit). For reconstruction, x is used with the original dictionary D to obtain y=Dx.

However, a critical fact in this method may be assumed: that the sparse representation of the periocular region alone in $D_\Lambda$ is similar to the representation of the entire face in D. This is a questionable assumption, since the dictionary learning procedure K-SVD does not explicitly optimize in that regard. Indeed, faces can be considered as an ensemble of features, with multiple individuals sharing a particular feature. The assumption of common approximation coefficients between the periocular region and the entire face in a dictionary learning full faces would imply that there exists a one-to-one relationship between the eye features and the other features of a face. Even though the algorithm for the hallucination problem would have to find weak correlations between periocular and facial features, a one-to-one correspondence is too strong an assumption and is unreasonable.

Recall that the problem is to hallucinate, for the sake of visual and practical purposes, the entire face from only the periocular region. Thus, the only true biometric that is observed is the given cropped periocular image. In this light, it is vital that the reconstructed face be faithful in the periocular region. However, standard methods of generating dictionaries, such as the typical use of K-SVD, do not focus on representing particular dimensions or parts of the signal better. A method which weighs errors due to the periocular region more than the rest of the face would tend to generate a reconstruction more faithful (higher PSNR) to that region.

Here one might argue that a simple work-around for this problem would be to train two dictionaries separately, one representing the full face $D_f$ and the other trained specifically for the periocular region $D_p$. Thereby, a low reconstruction error can be specifically optimized in the periocular region. A similar protocol could be followed for reconstruction by obtaining the sparse representation x of $y_\Lambda$ in $D_p$ and then reconstructing using $y = D_f x$. However, since the training of the two dictionaries is independent, there is no reason to hope that the K-sparse representation x of $y_\Lambda$ in $D_p$ is close to that of y in $D_f$. This is the same problem that was highlighted previously. Reconstruction using such a procedure is not expected to give accurate or visually appealing results.

This problem can be addressed by designing a dictionary learning procedure that attempts to enforce a consistent sparse representation across the two dictionaries $D_p$ and $D_f$ while weighting errors in $D_p$ more. Such a method would also address the problems brought to light previously. A simple reformulation of the objective function to arrive at one such procedure is presented below.

1.3 Dimensionally Weighted K-SVD Based Hallucination

The goal of embodiments of the present disclosure is to reconstruct or hallucinate the rest of the face given the periocular region. Considering the issues related to dictionary learning, the problem exists of jointly optimizing the learning procedure for the two goals. The first is to learn a dictionary of whole faces so as to include prior knowledge about the spatial relationships between the facial features and the periocular features. The second is to obtain a dictionary in which the reconstruction error for the periocular region is penalized more than the entire face and both are jointly minimized for the same sparse coefficients.

A simple approach is proposed which promotes the approximation coefficients to be jointly shared for the periocular region and the entire face. A first objective is to learn a dictionary by solving:

$$\underset{D,X}{\text{minimize}} \|Y - DX\|_F^2 \text{ such that } \forall i, \|x_i\|_0 < K \quad (1)$$

However, a low reconstruction error is desired using the same sparse coefficients restricted to the periocular region set $\Lambda$. Thus it is also desired to solve:

$$\underset{D_\Lambda,X}{\text{minimize}} \|Y_\Lambda - D_\Lambda X\|_F^2 \text{ such that } \forall i, \|x_i\|_0 < K \quad (2)$$

Combining the two objectives to solve them jointly allows a common K-sparse representation to be forced and also provides a trade-off between errors with an efficient algorithmic solution. The primary problem is therefore:

$$\underset{D,X,D_\Lambda}{\text{argmin}} \|Y - DX\|_F^2 + \beta \|Y_\Lambda - D_\Lambda X\|_F^2 \text{ such that } \forall i, \|x_i\|_0 < K \quad (3)$$

Here $\beta$ provides a trade-off between the reconstruction error of the periocular dimensions versus the entire face. Obtaining a consistent sparse encoding between the two sets of dimensions allows for a more meaningful reconstruction. This is made apparent by considering the reconstruction procedure. Given a novel periocular image, the sparse representation x in $D_\Lambda$ is obtained first. Then the reconstruction is obtained using Dx. Using the original K-SVD training method, a low reconstruction error is not expected in obtaining the entire face. Thus, relationships between periocular and other facial features are not explicitly learned. However, by forcing consistent sparse representations x during training, a low reconstruction error is optimized for both regions jointly and simultaneously. This can be enforced by applying the same coefficient (sparse representation) X to both D and $D_\Lambda$, as opposed to there being a separate X for D and $X_\Lambda$ for $D_\Lambda$. In other words, the enforcement of consistent sparse representation $X_\Lambda$ is "natually" done after stacking the two dictionaries together during training. Appropriate values for $\beta$ can be determined by empirical cross-validation. Suitable values for $\beta$ can be any value in the open range $(-\infty, \infty)$, however, in some embodiments and implementations, for good full face reconstruction, $\beta$ may be set to, e.g., 10,100, or 1,200. Further, in some embodiments, different values of $\beta$ may be used for different dimensions. Solving the formulation is achieved by a simple rearrangement before using the standard K-SVD:

$$\underset{D,D_\Lambda,X}{\text{argmin}} \left\| \begin{pmatrix} Y \\ \sqrt{\beta} Y_\Lambda \end{pmatrix} - \begin{pmatrix} D \\ \sqrt{\beta} D_\Lambda \end{pmatrix} X \right\|_F^2 \text{ such that } \forall i, \|x_i\|_0 \leq K \quad (4)$$

This translates to the standard K-SVD problem minimize$_{D',X'} \|Y'-D'X\|_2$ under $\|x_i\|_0 \leq K$ with $Y'=(Y^T, Y_\Lambda^T)^T$ and $D'=(D^T, D_\Lambda^T)^T$. In effect the formulation is equivalent to re-weighting dimensions belonging to $\Lambda$ by $(1+\sqrt{\beta})$. For convenience, this method is referred to as Dimensionally Weighted K-SVD or DW-KSVD. One can easily generalize this framework to include multiple subsets of other dimensions and/or to include different weights for different dimensions. This method, along with PCA based and K-SVD based methods, is open set thereby enabling reconstruction of any face that is not present in the training set. Although DW-KSVD has been described using $\|.\|_0$ as the pseudo-norm (or L0-norm) measuring sparsity, $\|.\|_1$ (or the L1-norm) may be used additionally or in place of $\|.\|_0$ using similar, although not necessarily identical, algorithms and equations, which those of ordinary skill in the art will be able to implement without undue experimentation after reading this disclosure in its entirety. Using the L1-norm instead of or in addition to the L0-norm may produce slightly different results than algorithms implemented exclusively using the L0-norm, and those results may have higher errors, but algorithms implemented using exclusively the L1-norm may be slightly more efficient, at least in terms of speed, and so may be more practical, particularly for realtime or high throughput applications. Other norms may also be used.

2. Experimental Results

2.1 Database

Figure 2:
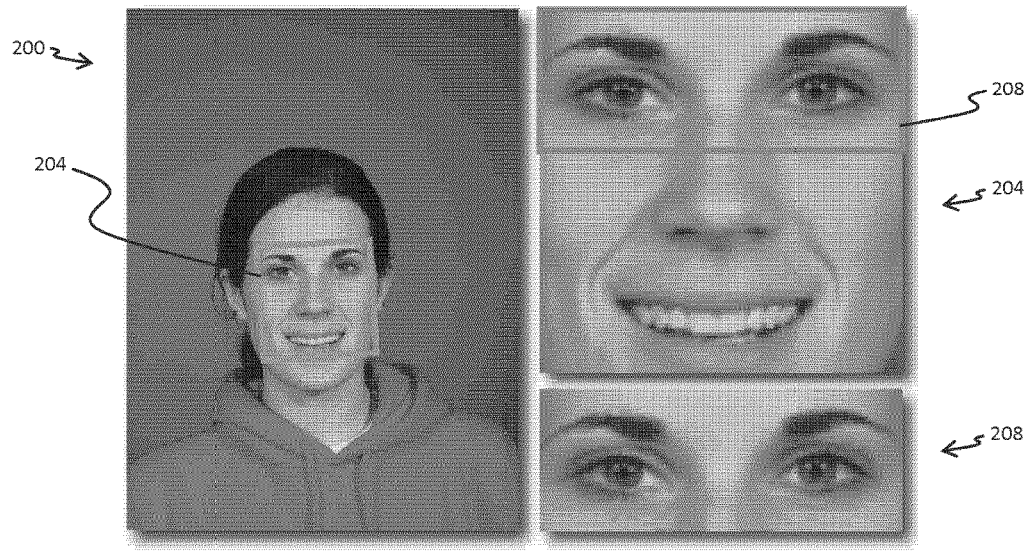
FIG. 2 is a set of images illustrating an example of a controlled still image from National Institute of Standards and Technology (NIST) Face Recognition Grand Challenge (FRGC) database, a cropped full face derived from the still, and a periocular region derived from the cropped full face.
Figure 3:
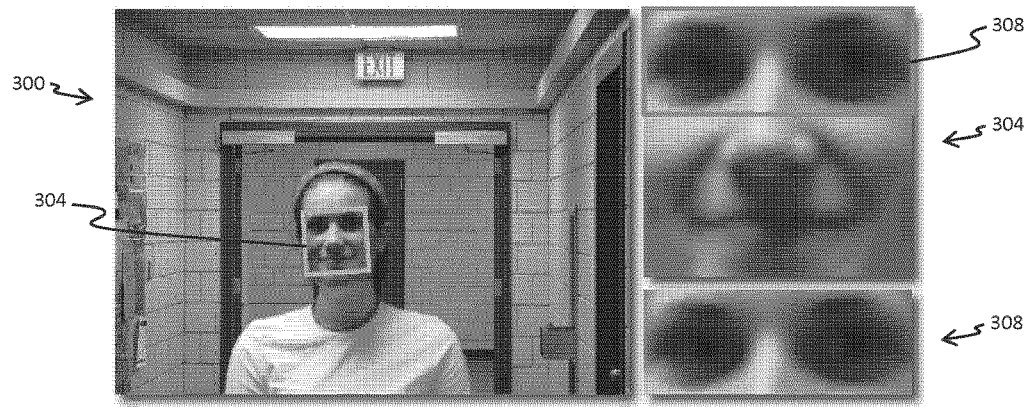
FIG. 3 is a set of images showing another example of an uncontrolled still image from the FRGC database of the same subject shown in FIG. 2, a cropped full face derived from the still, and a periocular region derived from the cropped full face.

All test experiments were performed on the FRGC version 2.0 database. This database contains three components. The first component is the generic training set, which contains both controlled and uncontrolled images of 222 subjects and a total of 12,776 images. The second component consists of the target set containing 466 different subjects with a total of 16,028 images. The third component consists of the probe set containing the same 466 subjects as in the target set, with half as many images for each person as in the target set, bringing the total number of probe images to 8,014. Image examples from the FRGC database are shown in FIGS. 2-3. In particular, FIG. 2 shows a controlled still image 200, a cropped full face 204 derived from the still, and a periocular region 208 derived from the cropped full face, while FIG. 3 shows an uncontrolled still image 300, a cropped full face 304 derived from the still, and a periocular region 308 derived from the cropped full face.

2.2 Dictionary Learning and Reconstruction

To learn (or train) the dictionary used for reconstruction, DW-KSVD was used, including 500,000 frontal mugshot images resized to 32 by 32 pixels (each having dimensions d=32×32=1024). Notably, in some embodiments, a bare minimum of about 5d (in this example, about 5,120) images of dimension d may be used to reconstruct an image of a face having dimension d and about 10d (here, about 10,240) images may be used to reconstruct a fairly accurate image; however, generally, the more images used for training, the more accurate the reconstructed image will be. A relatively large number of images are necessary to obtain a comprehensive dictionary of weak periocular-to-facial feature relationships. For all experiments, the number of dictionary elements was set to 5,000 and the maximum allowed sparsity K as 10 to force the dictionary elements to span a smaller local subspace to account for high variation between subjects. $\beta=100$ was set to strongly emphasize periocular reconstruction. The dictionary was initialized using randomly chosen data elements and K-SVD was run for 20 iterations for learning all dictionaries. The periocular region was defined in 32 by 32 images as the top 13 by 32 part of the image (see, e.g., FIGS. 2-3). In order to focus efforts on the reconstruction performance itself, exploring other templates was restricted; however, other templates could certainly be used. Embodiments of the present disclosure can handle, in a straight-forward way, cases in which the periocular region varies from the defined template. Further, accuracy of reconstructions can be improved if a larger region of a target (e.g., suspect) face than just the periocular region is available (e.g., other portions of the face, such as the nose or lips). Additionally, better face alignment in images (whether in training or of a target) typically leads to better reconstruction. For example, eyes of the periocular-only face (target) should align with the eyes of all the faces in the dictionary (from training) in order to maximize accuracy of hallucinations.

For reconstruction using DW-KSVD, the sparse representation of the periocular image was first obtained using OMP in the periocular component of the DW-KSVD dictionary. Reconstructing was then performed using the face component of the DW-KSVD dictionary and the same sparse coefficients. Note that a trade-off would exist in choosing sparsity K while using OMP for sparse representation during reconstruction. As K was increased, a lower periocular reconstruction error would be achieved; however, the full face reconstruction error might increase after a point. This is so because OMP is only optimizing for the periocular representation error and not the full face reconstruction error. To learn the optimal reconstruction sparsity for the task, a pilot experiment was conducted in which the PSNR was measured between the unseen original face and the reconstructed face while increasing sparsity. The peak signal-to-noise ratio (PSNR) was adopted as the measurement of reconstruction fidelity between images I and I' as follows:

$$PSNR = 10\log_{10}\left(\frac{255^2}{MSE}\right) = 10\log_{10}\left(\frac{255^2}{\frac{1}{mn}\sum_{i=0}^{m-1}\sum_{j=0}^{n-1}[I(i,j) - I'(i,j)]^2}\right).$$

Figure 4:
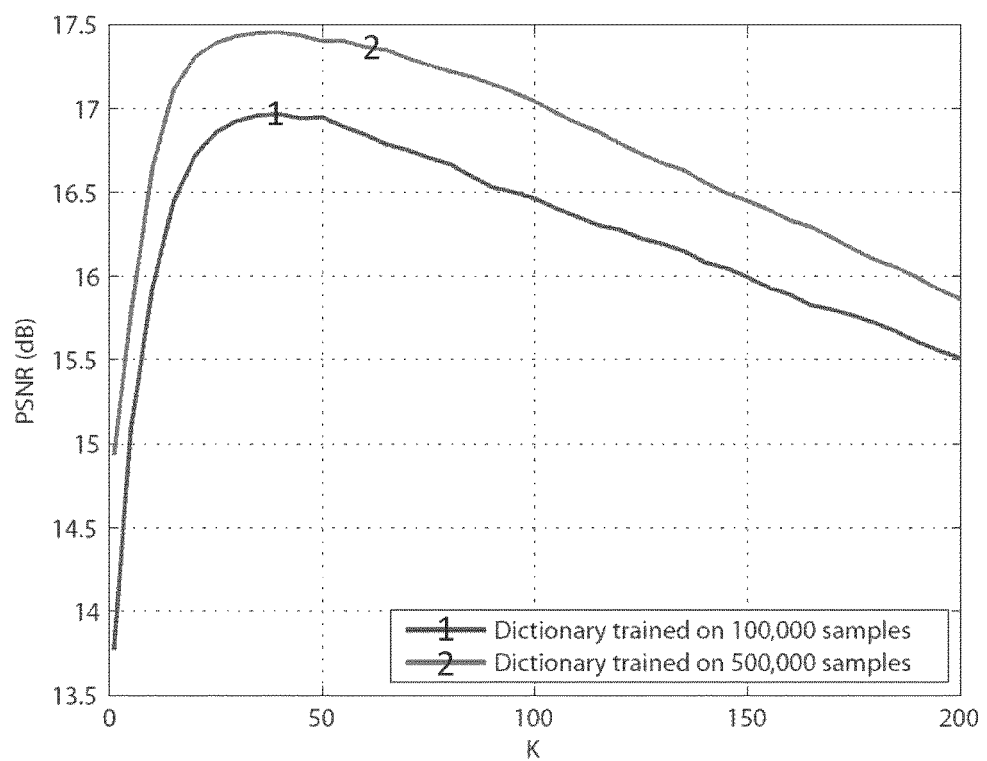
FIG. 4 is a graph illustrating peak signal-to-noise ratio (PSNR) versus reconstruction sparsity K using Dimensionally Weighted K-SVD (DW-KSVD) trained dictionaries.
Figure 5:
FIG. 5 is a set of images illustrating the first 200 dictionary elements of an exemplary K-SVD dictionary.
Figure 6:
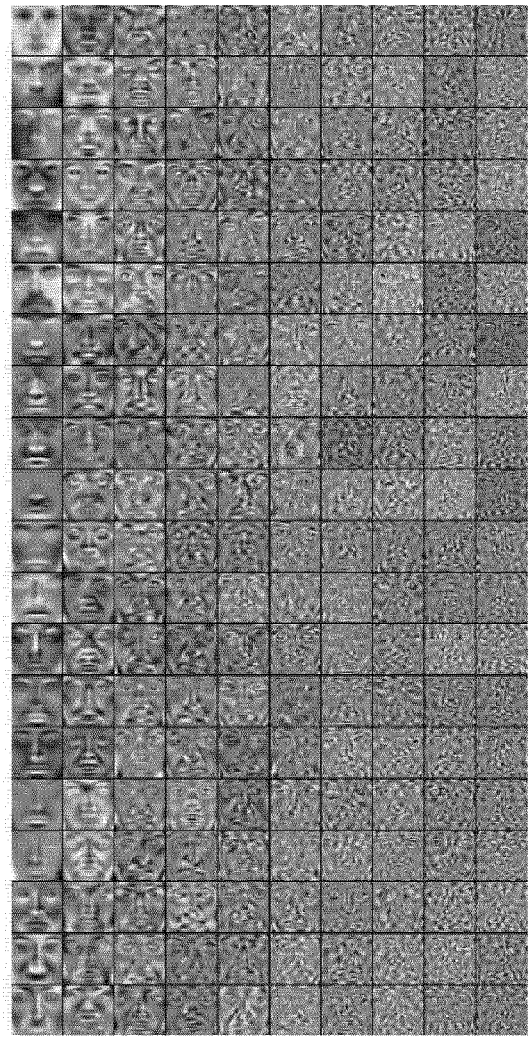
FIG. 6 is a set of images illustrating the first 200 dictionary elements of an exemplary principal component analysis (PCA) dictionary.
Figure 7:
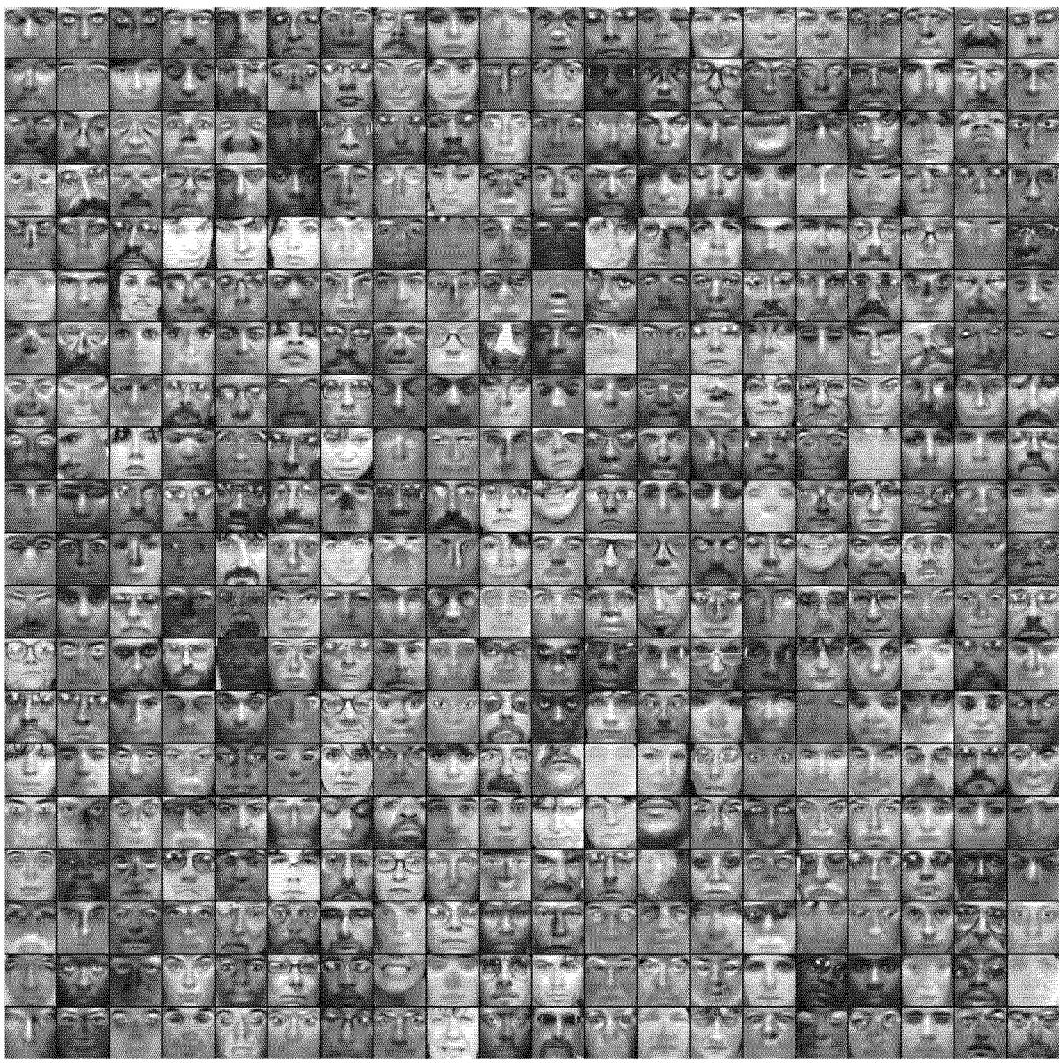
FIG. 7 is a set of images illustrating the first 400 dictionary elements of the full face component of a DW-KSVD dictionary trained using 500,000 training samples.
Figure 8:
FIG. 8 is a set of images illustrating the first 400 dictionary elements of the periocular component of a DW-KSVD dictionary trained using 500,000 training samples.

For the experiment, 1000 randomly chosen faces were used from FRGC and the PSNR of the reconstruction error was computed for each using DW-KSVD. FIG. 4 shows the mean PSNR varying with sparsity. The best full face reconstruction occurred using K=40, which was used for all further experiments, although other values could certainly be used. Also, the more training samples presented to the dictionary learning algorithm, the higher PSNR it can achieve in hallucinating the full face from the periocular region. FIGS. 5 and 6 showcase the first 200 dictionary elements of the K-SVD and PCA dictionaries, respectively. Notably, in the PCA dictionary represented in FIG. 6, the dictionary elements start to lose facial structures and shift to capture higher frequency components after the first 40 eigenfaces, while in the K-SVD dictionary represented in FIG. 5, visual appearances of the elements are close to the top eigenfaces where facial structures are well-preserved. This might explain why K-SVD and DW-KSVD leads to hallucinations with higher fidelity, as described further below. FIGS. 7-8 show a part of the full face component and the periocular component, respectively, of a dictionary trained using the proposed DW-KSVD algorithm. For display, the intensities for the two components are both normalized. In particular, two dictionaries may be trained (or learned): one for full faces (D) and one for periocular regions ($D_A$). As can be seen from Equation 4, the problem of learning both dictionaries can be performed at once, in a stacked fashion: D stacked on top of $\sqrt{(\beta)}D_\lambda$. Once the whole stack (two dictionaries) is learned, they can be split it into the full face dictionary component and the periocular dictionary component, as depicted in FIGS. 7 and 8, respectively.

2.3 Reconstruction Fidelity

One goal of the embodiments of the present disclosure is to provide a practical method for hallucinating a full face from the periocular region to aid further processing such as commercial face matching. However, a natural metric to evaluate methods for reconstruction would be to compare the reconstructed images to the original images using the PSNR metric. In this experiment, the entire target set was reconstructed in the FRGC database (16,028 images from 466 subjects) using the three methods and then the corresponding PSNR was computed for each pair. All experiments using PCA were restricted to the first 40 eigenvectors (the same number of dictionary elements that K-SVD and DW-KSVD would use), which can represent over 93.9% of the total energy.

Figure 9:
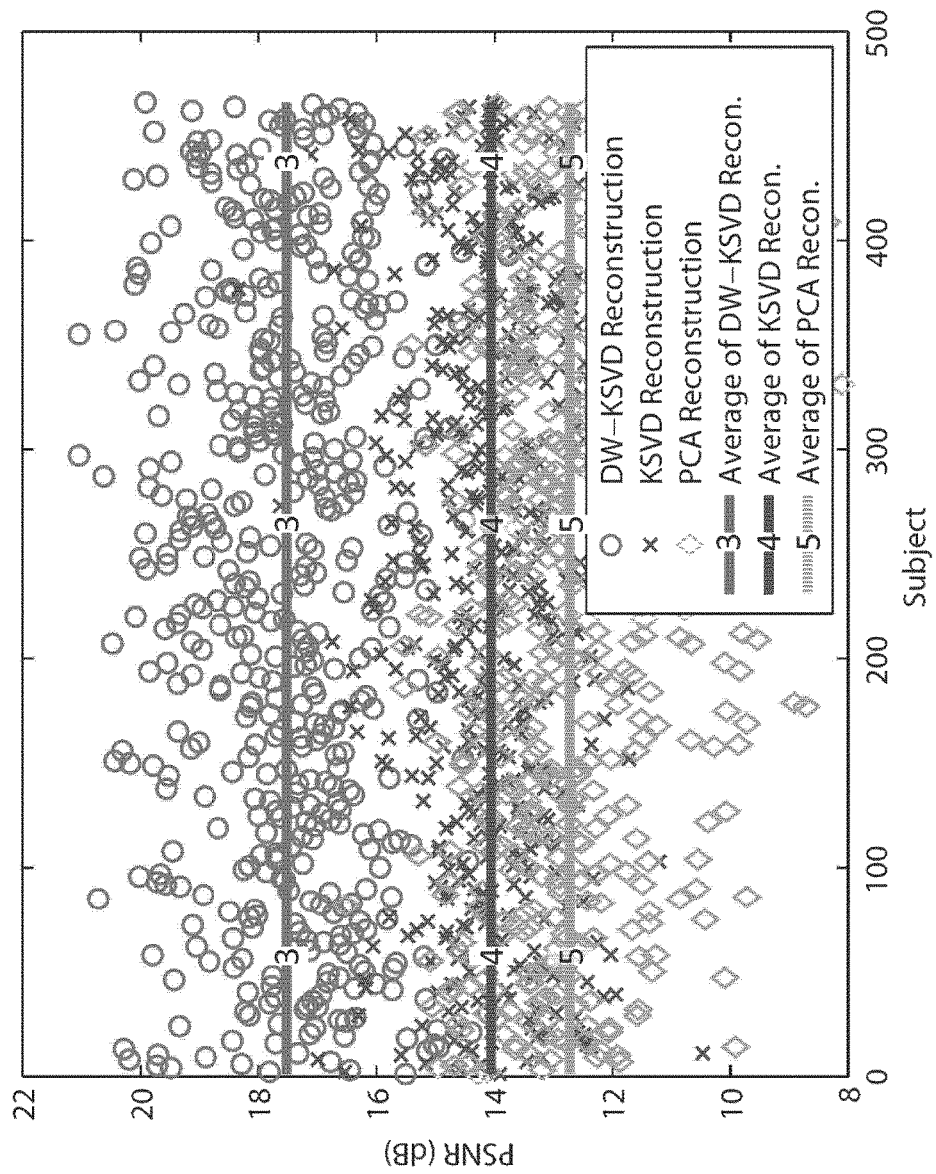
FIG. 9 is a scatter plot illustrating mean PSNR values of reconstruction errors of individual subjects (multiple images per subject) using three separate reconstruciton methods along with the overall mean for each of the three methods.
Figure 10:
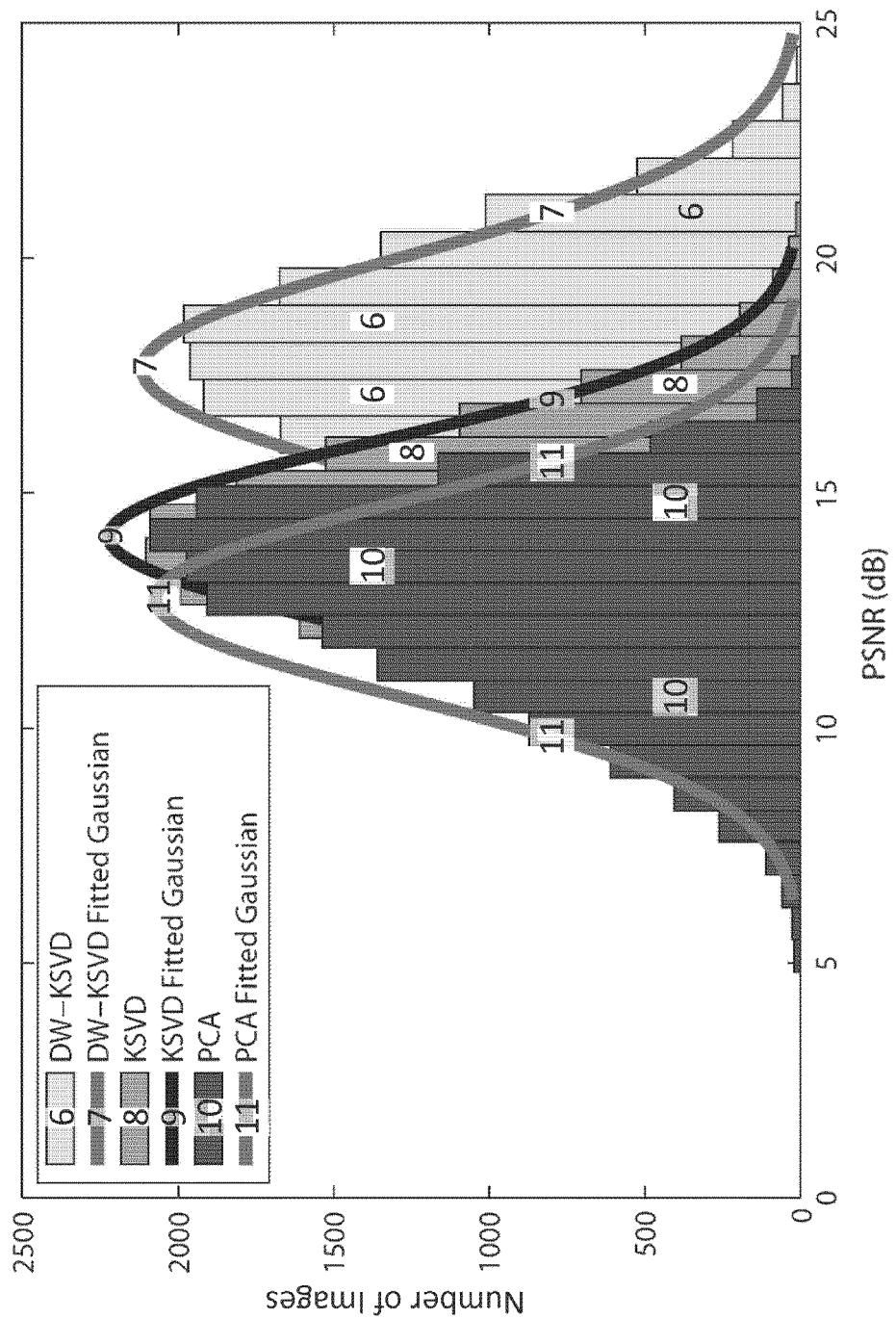
FIG. 10 is a histogram illustrating overall distribution of the PSNR values for three separate reconstruction methods along with corresponding fitted Gaussian curves for each of the three methods.
Figure 11:
FIG. 11 is a set of images illustrating original full face and periocular region crops as well as corresponding reconstructed images generated as a function of periocular region crops for various samples from FRGC.

FIG. 9 shows the overall mean PSNR computed for each subject (multiple images per subject) using DW-KSVD, K-SVD and PCA reconstruction (horizontal lines) along with the mean PSNR for each individual subject for the three methods (individual markers). In the FRGC target set, each individual has on average 34 images. FIG. 10 shows the corresponding histograms. DW-KSVD, on average, clearly outperforms both K-SVD and PCA by a large margin in PSNR. Table I shows the mean and the standard deviation of the distribution of the PSNR values. A few randomly chosen samples and their reconstructions are shown in FIG. 11. Most of the reconstructed faces are neutral in expression because dictionaries are trained on mugshot images, which typically have neutral expressions. This is actually beneficial because commercial matchers perform better using neutral expressions. The embodiments of the present disclosure eliminate expression variations and will be an asset for real-world matching.

DW-KSVD not only provides reconstructions with higher PSNR values on average but the reconstructions are much more visually appealing and similar to the original images than either PCA or K-SVD based reconstructions. This suggests that DW-KSVD and the combined formulation is able to extract the weak correlations and dependencies between the periocular and other facial features. Hence, explicitly penalising reconstruction error more in the periocular region appears to be favorable.

TABLE I

Mean and standard deviations for the distributions of the PSNR values for reconstruction

| Methods | Mean | Standard Deviation |
|---|---|---|
| PCA Recon. | 12.7439 | 2.1288 |
| KSVD Recon. | 14.0720 | 2.0532 |
| DW-KSVD Recon. | 17.6402 | 2.3757 |

2.4 Face Verification

A few results exploring face matching using the reconstructed faces are now presented. A large-scale face verification experiment was carried out to evaluate whether the hallucinated faces can practically replace the ground-truth full face in face verification.

2.4.1 Reconstructed Face Vs. Reconstructed Face

In a first verification experiment, NIST's FRGC Experiment 1 protocol was strictly followed, which involves 1-to-1 matching of the 16,028 controlled target images to themselves (~256 million pair-wise face match comparisons). For this experiment, the normalized cosine distance (NCD) was adopted to compute the similarities between images:

$$d(x, y) = 1 - \frac{x \cdot y}{\|x\|\|y\|}.$$

Figure 12:
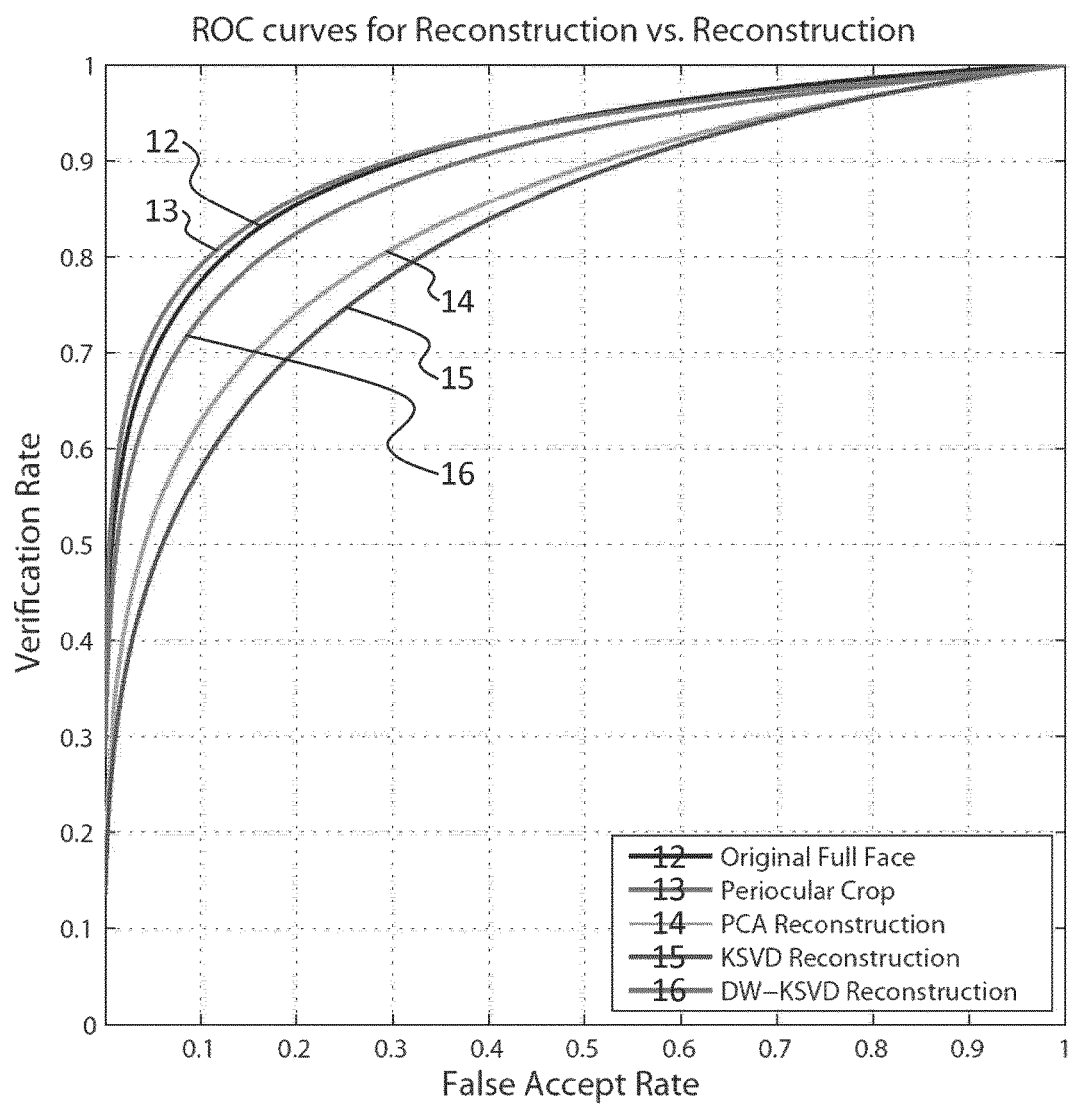
FIG. 12 is a graph illustrating receiver operating characteristic (ROC) curves obtained by following FRGC experiment 1 protocol (matching all sets to themselves) using raw pixels matched under the normalized cosine distance (NCD) metric.

The result of each algorithm was a similarity matrix with the size 16,028×16,028 whose entry $SimM_{ij}$ was the NCD between the feature vector of query image i and gallery image j. In the case of FRGC Experiment 1, the query set and gallery set were the same. The performance was analyzed using verification rate (VR) at 1% (0.01) false accept rate (FAR), equal error rate (EER) and the receiver operating characteristic (ROC) curves. Table II shows the VR at 1% FAR and EER for the FRGC Experiment 1 evaluation. FIG. 12 shows the corresponding ROC curves. It can be noted from the table as well as the plot that DW-KSVD can achieve comparable results to the full face evaluation, which, from another angle, shows the fidelity of the hallucination. Further, it clearly outperforms both PCA and K-SVD based reconstructions. The periocular region crop was observed to perform slightly better than the full face. This was because two facial expressions were presented by each subject in the FRGC target set: neural and smiling. The periocular region, however, was less affected by such expression variations, thus giving rise to slightly better performance than the full face. This observation raises a valid point that one may focus on periocular region which has higher tolerance for expression variations when matching faces with unconstrained expressions.

Since this protocol matched the reconstructions to themselves, the reconstructed images preserved biometric and identity information amongst themselves almost as well as the original images. The performance is not expected to drop too much if the entire system was trained on reconstructed images. This however was impractical to perform in this experiment, although it can be done, because it was very hard to retrain commercial matchers and the original problem was to evaluate the reconstructions using recognition systems trained on original images. To evaluate this, a second verification experiment was run in which the original images were matched with the reconstructed images for all methods, i.e., the targets were the original images and the probes were the reconstructed images.

2.4.2 Original Face Vs. Reconstructed Face

Figure 13:
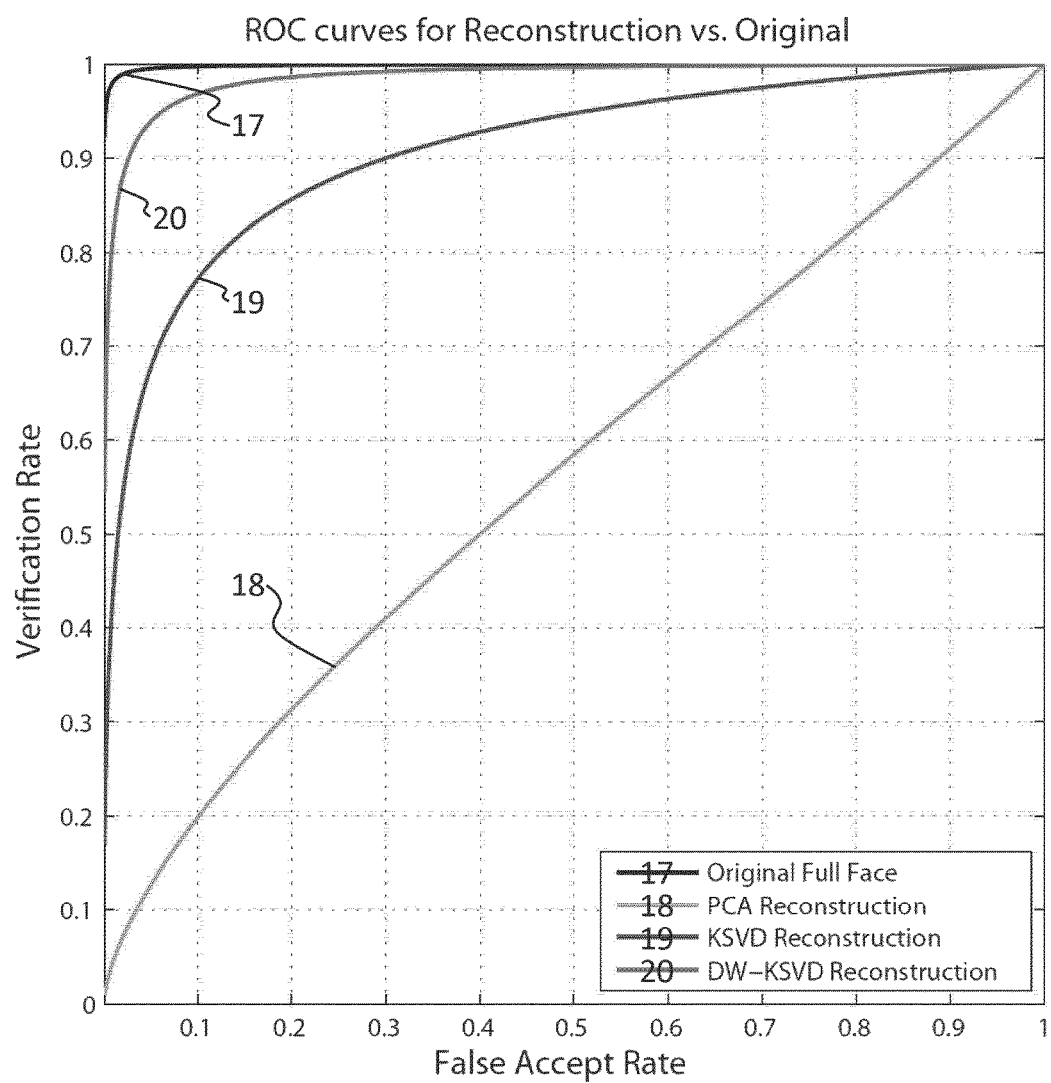
FIG. 13 is a graph illustrating ROC curves obtained by matching all sets to the original full faces using KCFA features matched under the NCD metric.

For this experiment, a face verification algorithm was used that had good performance in NIST's FRGC evaluation: the kernel class-dependence feature analysis (KCFA). In the experiment, KCFA was trained on the original images of the 222 subjects belonging to the FRGC training set. The original face images of the FRGC target set were matched to the corresponding reconstructed images using the KCFA feature vectors extracted. Thus, a real-world situation was simulated, i.e., matching the reconstructed images to the original ones with a verification algorithm that had been trained on unseen original images. Reconstructed images using DW-KSVD was observed to have performed competitively as compared to matching the original images themselves. FIG. 13 shows the ROC curves corresponding to this experiment (see also Table III). Among the three methods, DW-KSVD clearly outperformed both PCA and K-SVD reconstructions and the ROC curve showed that the evaluation was indeed competitive with the one using the original full faces. Thus, the periocular based full face reconstruction using DW-KSVD is a practical solution in cases where the face verification system cannot adapt to partial faces. Moreover, it clearly outperforms both PCA and K-SVD based reconstructions in all evaluations. One reason that PCA's VR is lower than K-SVD in this protocol but higher in the previous one might be that the truncated PCA reconstruction produced faces lacked details and tended toward the mean face. Thus, for matching reconstruction to reconstruction images, PCA actually gains by looking like each other. However, such a lack of detail hurt PCA in the second protocol when matching reconstructed faces to the original ones. Thus for face hallucination, this provides another reason to favor the sparse representation in an overcomplete basis framework. Note that for this experiment, the same problem was arrived at that motivated this study. The periocular region was unable to be matched to the original face given the trained KCFA based matcher, which is why no periocular ROC curve exists in FIG. 13.

3. Conclusion

A practical and effective method to hallucinate a full face image using only the periocular region has been presented. Such a method would have applications in areas such as commercial face matching and law enforcement where currently algorithms are not adaptive to making use of only the periocular region of a face. The DW-KSVD algorithm is a modification of the K-SVD dictionary learning paradigm tailored so as to emphasize more accurate reconstruction of a subset of dimensions (in this case the periocular region). The experiments identified herein demonstrated that reconstruction using DW-KSVD can be practically used to hallucinate faces from the periocular region without sacrificing face verification performance too much. Further, this method is open set and can hallucinate faces not present in training. It also outperforms standard K-SVD and PCA based reconstruction schemes in the same tasks. This method is general in that one can try to reconstruct an entire signal given a part of it, given that weak correlations exist between that part and the rest of the signal.

TABLE II

VR at 1% FAR and EER for the FRGC Experiment 1 evaluation (bottom three rows correspond to matching reconstructed faces to the reconstructed faces

| Methods | VR at 1% FAR | EER |
|---|---|---|
| Original Full Face | 0.524 | 0.170 |
| Periocular Region | 0.561 | 0.161 |
| DW-KSVD Recon. | 0.475 | 0.188 |
| KSVD Recon. | 0.285 | 0.248 |
| PCA Recon. | 0.329 | 0.236 |

TABLE III

VR at 1% FAR and EER for the FRGC Experiment 1 evaluation using KCFA (bottom three rows correspond to matching reconstructed faces to the original full faces)

| Methods | VR at 1% FAR | EER |
|---|---|---|
| Original Full Face | 0.982 | 0.014 |
| DW-KSVD Recon. | 0.826 | 0.056 |
| KSVD Recon. | 0.438 | 0.165 |
| PCA Recon. | 0.046 | 0.452 |

Exemplary Computing System

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 14:
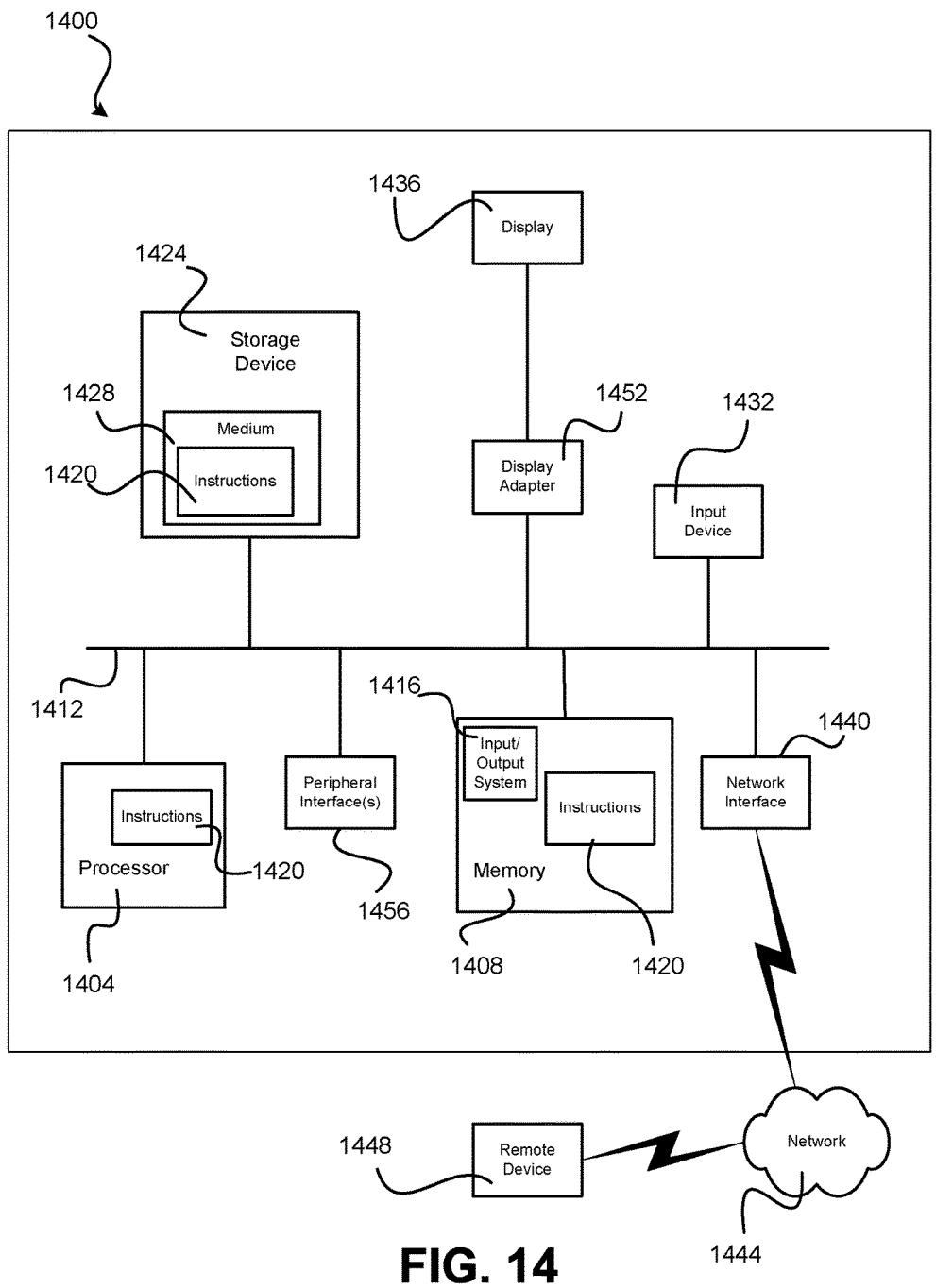
FIG. 14 is a diagrammatic view of a computing system suitable for use in executing aspects of the present invention.

FIG. 14 shows a diagrammatic representation of one embodiment of a computing device in the exemplary form of a computer system 1400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1400 includes a processor 1404 and a memory 1408 that communicate with each other, and with other components, via a bus 1412. Bus 1412 may include any of several types of bus structures including, but not limited to, a memory bus, a memory controller, a peripheral bus, a local bus, and any combinations thereof, using any of a variety of bus architectures.

Memory 1408 may include various components (e.g., machine-readable media) including, but not limited to, a random access memory component, a read only component, and any combinations thereof. In one example, a basic input/output system 1416 (BIOS), including basic routines that help to transfer information between elements within computer system 1400, such as during start-up, may be stored in memory 1408. Memory 1408 may also include (e.g., stored on one or more machine-readable media) instructions (e.g., software) 1420 embodying any one or more of the aspects and/or methodologies of the present disclosure. In another example, memory 1408 may further include any number of program modules including, but not limited to, an operating system, one or more application programs, other program modules, program data, and any combinations thereof.

Computer system 1400 may also include a storage device 1424. Examples of a storage device (e.g., storage device 1424) include, but are not limited to, a hard disk drive, a magnetic disk drive, an optical disc drive in combination with an optical medium, a solid-state memory device, and any combinations thereof. Storage device 1424 may be connected to bus 1412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1424 (or one or more components thereof) may be removably interfaced with computer system 1400 (e.g., via an external port connector (not shown)). Particularly, storage device 1424 and an associated machine-readable medium 1428 may provide nonvolatile and/or volatile storage of machine-readable instructions, data structures, program modules, and/or other data for computer system 1400. In one example, software 1420 may reside, completely or partially, within machine-readable medium 1428. In another example, software 1420 may reside, completely or partially, within processor 1404.

Computer system 1400 may also include an input device 1432. In one example, a user of computer system 1400 may enter commands and/or other information into computer system 1400 via input device 1432. Examples of an input device 1432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1432 may be interfaced to bus 1412 via any of a variety of interfaces (not shown) including, but not limited to, a serial interface, a parallel interface, a game port, a USB interface, a FIREWIRE interface, a direct interface to bus 1412, and any combinations thereof. Input device 1432 may include a touch screen interface that may be a part of or separate from display 1436, discussed further below. Input device 1432 may be utilized as a user selection device for selecting one or more graphical representations in a graphical interface as described above.

A user may also input commands and/or other information to computer system 1400 via storage device 1424 (e.g., a removable disk drive, a flash drive, etc.) and/or network interface device 1440. A network interface device, such as network interface device 1440, may be utilized for connecting computer system 1400 to one or more of a variety of networks, such as network 1444, and one or more remote devices 1448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1444, may employ a wired and/or a wireless mode of communication. In general, any network topology may be used. Information (e.g., data, software 1420, etc.) may be communicated to and/or from computer system 1400 via network interface device 1440.

Computer system 1400 may further include a video display adapter 1452 for communicating a displayable image to a display device, such as display device 1436. Examples of a display device include, but are not limited to, a liquid crystal display (LCD), a cathode ray tube (CRT), a plasma display, a light emitting diode (LED) display, and any combinations thereof. Display adapter 1452 and display device 1436 may be utilized in combination with processor 1404 to provide graphical representations of aspects of the present disclosure. In addition to a display device, computer system 1400 may include one or more other peripheral output devices including, but not limited to, an audio speaker, a printer, and any combinations thereof. Such peripheral output devices may be connected to bus 1412 via a peripheral interface 1456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of hallucinating facial features of a first face by prioritizing reconstruction errors, wherein the first face is present in an image in which a first portion of the first face is un-occluded and a second portion of the first face is occluded, the method comprising:
   receiving the image of the first face, the first portion containing one or more first facial features;
   training a machine-learning algorithm using a set of images each containing a region of a face of an individual corresponding to the first portion of the first face and a region of the face of the individual corresponding to the second portion of the first face so as to produce machine-learning data or receiving machine-learning data corresponding to a previous implementation of such training; and
   hallucinating one or more second facial features within the second portion of the first face as a function of the machine-learning data by prioritizing reconstruction errors for hallucinating the one or more second facial features such that reconstruction error for the one or more first facial features is minimized with a higher priority than reconstruction error for hallucinating the one or more second facial features.

2. A method according to claim 1, wherein the first portion of the first face is a periocular region.

3. A method according to claim 1, wherein the machine-learning algorithm utilizes a K-SVD algorithm, a convolutional neural network algorithm, an autoencoder algorithm, a sparse filtering algorithm, a method of optimized directions algorithm, an online dictionary learning method, a recursive least squares dictionary learning algorithm, or a combination thereof.

4. A method according to claim 1, wherein the machine-learning algorithm utilizes a K-SVD algorithm and said training further comprises:
generating a first dictionary as a function of the regions of the faces of individuals corresponding to the first portion in the set of images; and
generating a second dictionary as a function of both the regions of the faces of individuals corresponding to the first portion and the regions of the faces of the second portion in the set of images.

5. A method according to claim 4, further comprising jointly and simultaneously minimizing reconstruction error for the one or more first facial features and reconstruction error for hallucinating the one or more second facial features for the same sparse coefficients.

6. A method according to claim 5, wherein jointly and simultaneously minimizing reconstruction errors includes forcing consistent sparse representations during said training.

7. A method according to claim 1, wherein the set of images consists of images of individuals of a particular gender or set of genders, ethnicity or set of ethnicities, age or range of ages, or a combination thereof, wherein the particular gender or set of genders, ethnicity or set of ethnicities, age or range of ages, or combination thereof is selected as a function of the first face.

8. A method according to claim 1, further comprising generating a composite image including the first and second features of the first face.

9. A method according to claim 8, further comprising comparing the composite image to one or more images of individuals, each image containing at least a region of a face of an individual corresponding to the first portion of the first face and a region of the face of the individual corresponding to the second portion.

10. A method according to claim 1, wherein prioritizing reconstruction errors for hallucinating the one or more second facial features is optimized by cross-validation.

11. A machine-readable storage medium containing machine-executable instructions for performing a method of hallucinating facial features of a first face by prioritizing reconstruction errors, wherein the first face is present in an image in which a first portion of the first face is un-occluded and a second portion of the first face is occluded, said machine-executable instructions comprising:
a first set of machine-executable instructions for receiving the image of the first face, the first portion containing one or more first facial features;
a second set of machine-executable instructions for training a machine-learning algorithm using a set of images each containing a region of a face of an individual corresponding to the first portion of the first face and a region of the face of the individual corresponding to the second portion of the first face so as to produce machine-learning data or receiving machine-learning data corresponding to a previous implementation of such training; and
a third set of machine-executable instructions for hallucinating one or more second facial features with the second portion of the first face as a function of the machine-learning data by prioritizing reconstruction errors for hallucinating the one or more second facial features such that reconstruction error for the one or more first facial features is minimized with a higher priority than reconstruction error for hallucinating the one or more second facial features.

12. A machine-readable storage medium according to claim 11, wherein the first portion of the first face is a periocular region.

13. A machine-readable storage medium according to claim 11, wherein the machine-learning algorithm utilizes a K-SVD algorithm, a convolutional neural network algorithm, an autoencoder algorithm, a sparse filtering algorithm, a method of optimized directions algorithm, an online dictionary learning method, a recursive least squares dictionary learning algorithm, or a combination thereof.

14. A machine-readable storage medium according to claim 11, wherein the machine-learning algorithm utilizes a K-SVD algorithm and said second set of machine-executable instructions for training further comprises:
a set of machine-executable instructions for generating a first dictionary as a function of the regions of the faces of individuals corresponding to the first portion in the set of images; and
a set of machine-executable instructions for generating a second dictionary as a function of both the regions of the faces of individuals corresponding to the first portion and the regions of the faces of the second portion in the set of images.

15. A machine-readable storage medium according to claim 14, further comprising a fourth set of machine-executable instructions for jointly and simultaneously minimizing reconstruction error for the one or more first facial features and reconstruction error for hallucinating the one or more second facial features for the same sparse coefficients.

16. A machine-readable storage medium according to claim 15, wherein jointly and simultaneously minimizing reconstruction errors includes forcing consistent sparse representations during said training.

17. A machine-readable storage medium according to claim 11, wherein the set of images consists of images of individuals of a particular gender or set of genders, ethnicity or set of ethnicities, age or range of ages, or a combination thereof, wherein the particular gender or set of genders, ethnicity or set of ethnicities, age or range of ages, or combination thereof is selected as a function of the first face.

18. A machine-readable storage medium according to claim 11, further comprising a fourth set of machine-executable instructions for generating a composite image including the first and second features of the first face.

19. A machine-readable storage medium according to claim 18, further comprising a fifth set of machine-executable instructions for comparing the composite image to one or more images of individuals, each image containing at least a region of a face of an individual corresponding to the first portion of the first face and a region of the face of the individual corresponding to the second portion.

20. A machine-readable storage medium according to claim 11, wherein prioritizing reconstruction errors for hallucinating the one or more second facial features is optimized by cross-validation.

* * * * *